(12) United States Patent
Bertrand et al.

(10) Patent No.: US 7,055,661 B2
(45) Date of Patent: Jun. 6, 2006

(54) HYDRAULIC SHOCK ABSORBER WITH ADJUSTING OF SHOCK ABSORBING TYPE

(75) Inventors: Michel Bertrand, Cluses (FR); Jean-Pierre Perret, Thyez (FR)

(73) Assignee: Etablissements Jean Perret, Cluses (FR)

( * ) Notice: Subject to any disclaimer, the term of this patent is extended or adjusted under 35 U.S.C. 154(b) by 0 days.

(21) Appl. No.: 10/239,603

(22) PCT Filed: Mar. 19, 2001

(86) PCT No.: PCT/FR01/00809

§ 371 (c)(1), (2), (4) Date: Jan. 27, 2003

(87) PCT Pub. No.: WO01/73314

PCT Pub. Date: Oct. 4, 2001

(65) Prior Publication Data

US 2004/0020729 A1    Feb. 5, 2004

(51) Int. Cl.
*F16F 9/48* (2006.01)
(52) U.S. Cl. ............. 188/287; 188/285; 188/315; 188/322.19
(58) Field of Classification Search ............. 188/266.4, 188/284, 285, 286, 287, 313, 314, 315, 322.19
See application file for complete search history.

(56) References Cited

U.S. PATENT DOCUMENTS

| | | | |
|---|---|---|---|
| 984,377 A * | 2/1911 | Kilgour | 188/287 |
| 3,598,206 A * | 8/1971 | Hennells | 188/287 |
| 3,750,856 A * | 8/1973 | Kenworthy | 188/287 |
| 3,782,710 A * | 1/1974 | Selke et al. | 267/118 |
| 3,840,097 A | 10/1974 | Holley | 188/287 |
| 4,071,122 A | 1/1978 | Schupner | 188/285 |
| 4,298,101 A | 11/1981 | Dressell, Jr. et al. | 188/285 |
| 4,465,166 A * | 8/1984 | Moore | 188/278 |
| 4,702,355 A * | 10/1987 | Heideman | 188/285 |
| 5,598,904 A | 2/1997 | Spyche, Jr. | 188/287 |

* cited by examiner

*Primary Examiner*—Robert A. Siconolfi
*Assistant Examiner*—Bradley King
(74) *Attorney, Agent, or Firm*—Fay, Sharpe, Fagan, Minnich & McKee, LLP

(57) ABSTRACT

A shock absorber (1) includes a compression chamber (2) in which a piston (3) moves along a path of travel from a near end to a far end. The chamber includes a constant force mode bleed orifice (10) adjacent the far end and a series of progressive force bleed orifices (9a–9e) at spaced intervals between the near and far ends. An adjustment cylinder (12) has sloping arcuate apertures (13a–13e). As the cylinder (12) is rotated, one of the arcuate apertures aligns with the constant force orifice or the apertures align with the progressive force orifices in full or in part.

8 Claims, 7 Drawing Sheets

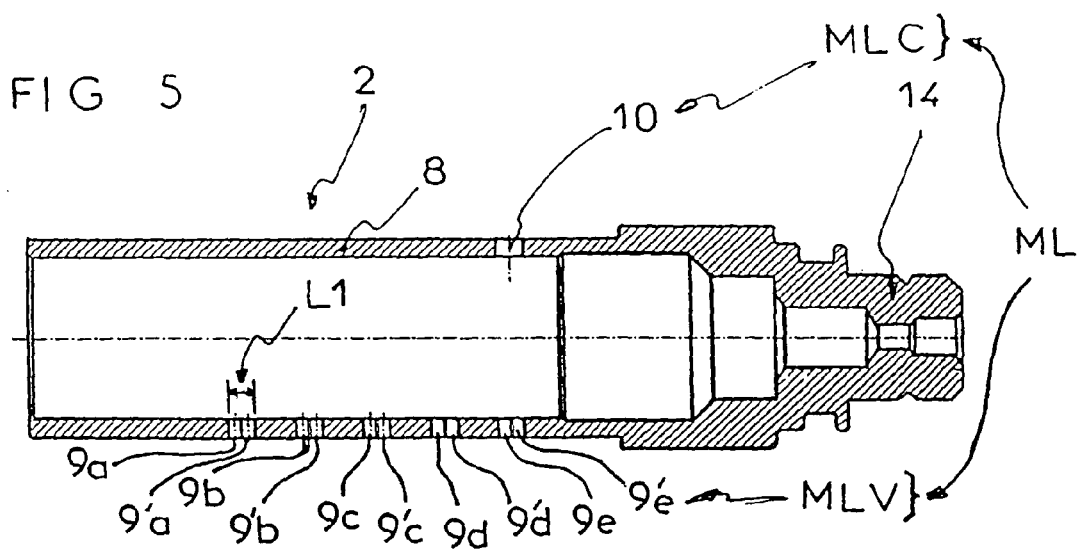
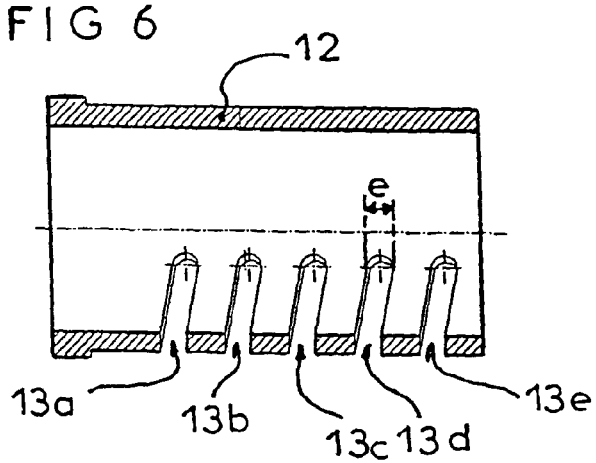
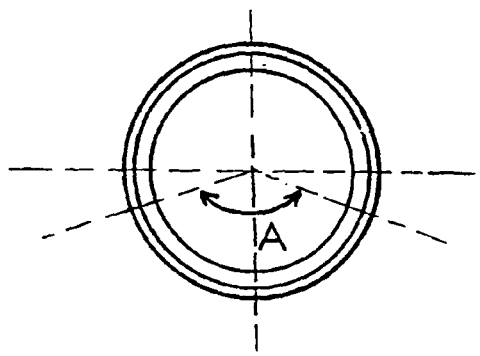
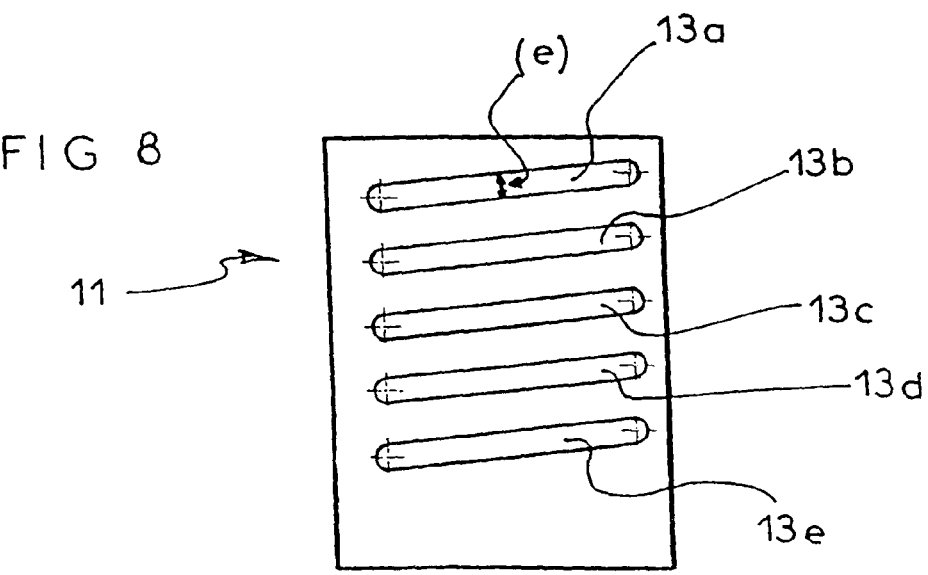

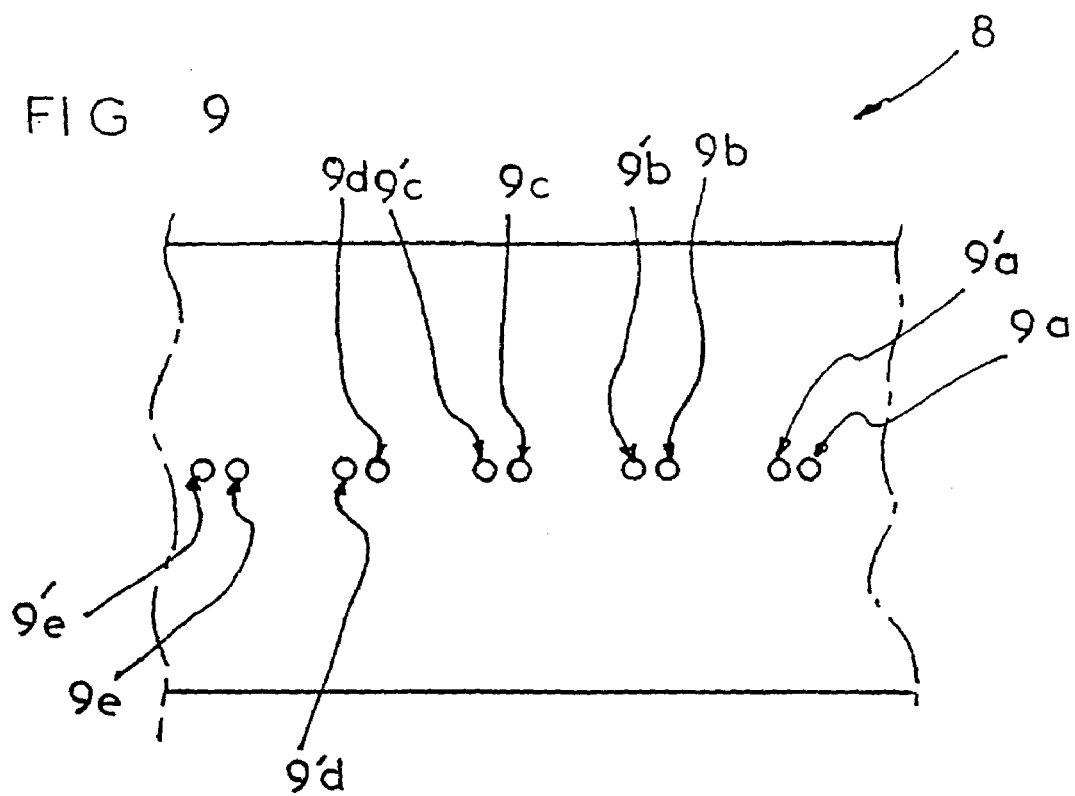
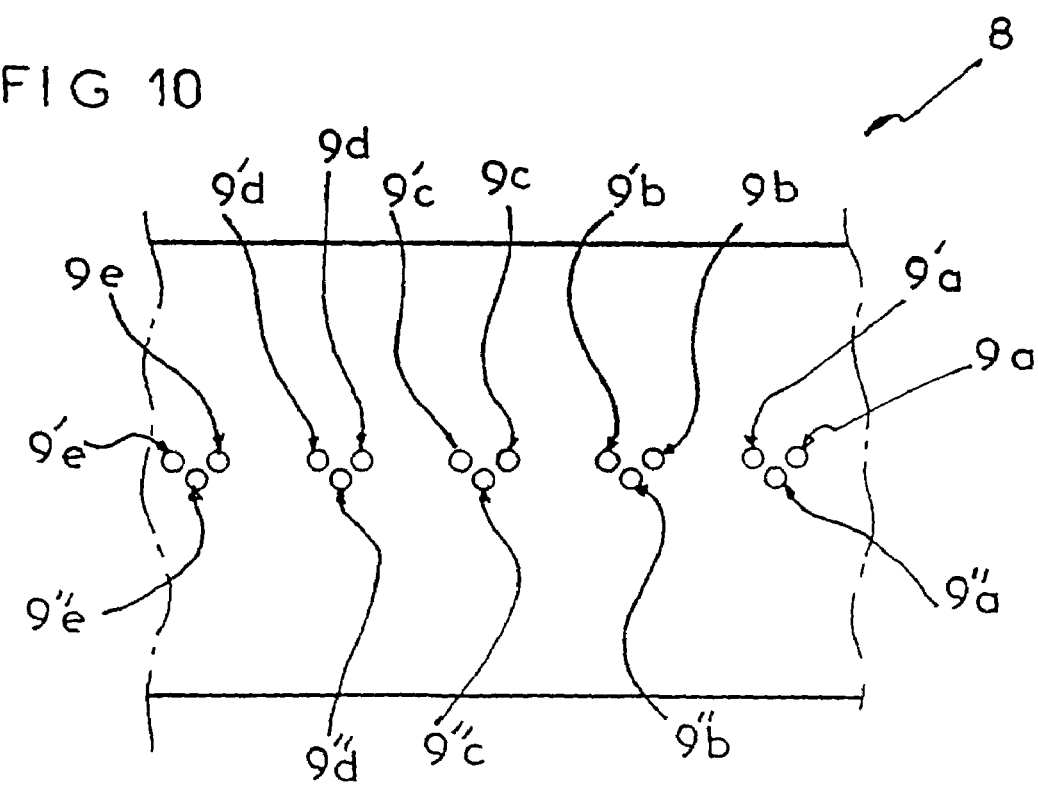

HYDRAULIC SHOCK ABSORBER WITH ADJUSTING OF SHOCK ABSORBING TYPE

BACKGROUND OF THE INVENTION

The present invention concerns a hydraulic shock absorber and, more particularly, it concerns an improvement, by means of which it is possible to choose the type of damping and which notably permits passing from a linear variation of damping to a progressive variation and inversely.

Numerous types of hydraulic shock absorbers are known, which are utilized in many application fields, and which are quite different from each other, such as for example, the automobile, industry, robotics, automatic delivery apparatuses or housing. The diversity of the encountered fields and the specific constraints associated with each one of these, has lead the manufacturers to developing shock absorbers which are adapted to their proper application conditions and, consequently, to the constraints of their respective environment. Thus, each shock absorbers has its own mechanical characteristics, which are intended to bestow on it optimal properties adapted to the involved field.

In the state of the art, linear type shock absorbers are known which permit slowing down a load with a constant force of resistance or shock absorbers of the so-called progressive type, which permit slowing down a charge with a variable damping force, as shown in FIG. 1.

However, in spite of the diversity of the existing shock absorbers, certain applications do not appear to have shock absorbers adapted to their specific utilization constraints. Furthermore, in certain fields, the constraints which are applied to the shock absorber can vary greatly and the shock absorber thus is only adapted to one or several areas of reduced operation and lacks adaptation with respect to basic operating constraints.

Consequently, it is the object of the present invention to resolve the aforementioned problems with the aid of simple means, which can easily be implemented, which are reliable and which are not very costly. Proposed is a hydraulic shock absorber which is likely to adapt itself to a large range of different constraints, thanks to specific adjustment of its damping properties.

SUMMARY OF THE INVENTION

According to its principal characteristic, the shock absorber according to the invention is of the hydraulic type, comprising a shock absorber body, on the inside of which is arranged a compression chamber in which slides a piston and its rod for compressing the damping fluid, which it bleeds with a bleeding means, and is characterized in that it presents at least two different operating modes corresponding to different bleed rate means and in that it comprises adjusting means permitting passage from one operating mode to the other.

According to another characteristic of the invention, the shock absorber comprises constant bleed rate means which correspond to a linear operating mode of the shock absorber and variable bleed rate means which correspond to a progressive operating mode of shock absorbing.

According to one characteristic of the shock absorber, it comprises constant bleed rate means constituted by a bleed comprises orifice situated in the lower part of the wall of the compression chamber to connect the lower part of said chamber with a compensation chamber for shock absorber volume.

According to another characteristic of the shock absorber, it is characterized in that it comprises variable bleed rate means formed by a set of bleed orifices arranged in the wall of the compression chamber in order to connect same with a shock absorber compensation chamber and distributed along the course of the piston.

According to the preferred embodiment of the shock absorber according to the invention, the compression chamber comprises a peripheral cylindrical wall, which includes along one of its generative systems the bleed orifices of the variable bleed rate means and at the other generative system the orifice for constant bleed rate means and in that the adjusting means are constituted by an adjustment socket mounted mobile in rotation around the compression chamber between a linear position where the orifices of the variable bleed rate means are obstructed by the wall of the socket and at least one position where the orifices of the variable bleed rate means are at least partially free.

According to a complementary characteristic of the shock absorber according to the invention, the adjustment means are constituted by an adjustment socket respectively mobile in relation to the bleed orifices situated in the peripheral wall of the compression chamber and which form the different bleed rate means.

According to another characteristic of the shock absorber, it is characterized in that the control socket comprises a peripheral wall which includes a succession of parallel vents, said vents extending partially over a portion of the arc in a slightly inclined plane in relation to a transverse diametric plane.

According to the preferred embodiment of the shock absorber according to the invention, the relative position of the adjustment socket and of the compression chamber is regulated by a control button of the adjustment means, with control of position being of the continuous adjustment type.

According to said embodiment, the variable bleed rate means are realized by a succession of orifices arranged in pairs or in a group of three.

According to a variation of the shock absorber according to the invention, it is characterized in that the dimensions of the variable bleed rate means and/or their spacing vary (varies) along the course of the piston.

Other characteristics and benefits of the invention are apparent from the description which is given below with respect to the attached drawings—and which are provided by way of example only and are not limited thereto.

BRIEF DESCRIPTION OF THE DRAWINGS

The invention may take form in various components and arrangements of components, and in various steps and arrangements of steps. The drawings are only for purposes of illustrating a preferred embodiment and are not to be construed as limiting the invention.

FIGS. 1 to 11 illustrate the preferred embodiment of the shock absorber and variations of execution.

FIG. 1 illustrates by way of a diagram two operating modes of a shock absorber depicting graphically the force to be applied in proportion to the course traveled, one linear operating mode and one progressive operating mode.

FIG. 2 is a view of a longitudinal section of the shock absorber according to the invention in its linear damping position.

FIG. 3 is a view in longitudinal section of the shock absorber according to the invention in a progressive damping position.

FIG. 4 is a view in longitudinal section of the shock absorber according to the invention in a second position of progressive damping.

FIG. 5 is a view in longitudinal section of the compression chamber.

FIGS. 6, 7 and 8 illustrate the external socket,—FIG. 6 being a view in longitudinal section, while FIG. 8 is a lateral view and FIG. 7 an end view.

FIG. 9 represents in detail the orifices of the variable bleed rate means of the compression chamber.

FIG. 10 represents according to a view which is similar to FIG. 9, an execution variation of the variable bleed rate means.

FIG. 11 illustrates in longitudinal section an execution variation of the preferred embodiment of the shock absorber according to the invention.

DETAILED DESCRIPTION OF THE PREFERRED EMBODIMENTS

Figure 1:
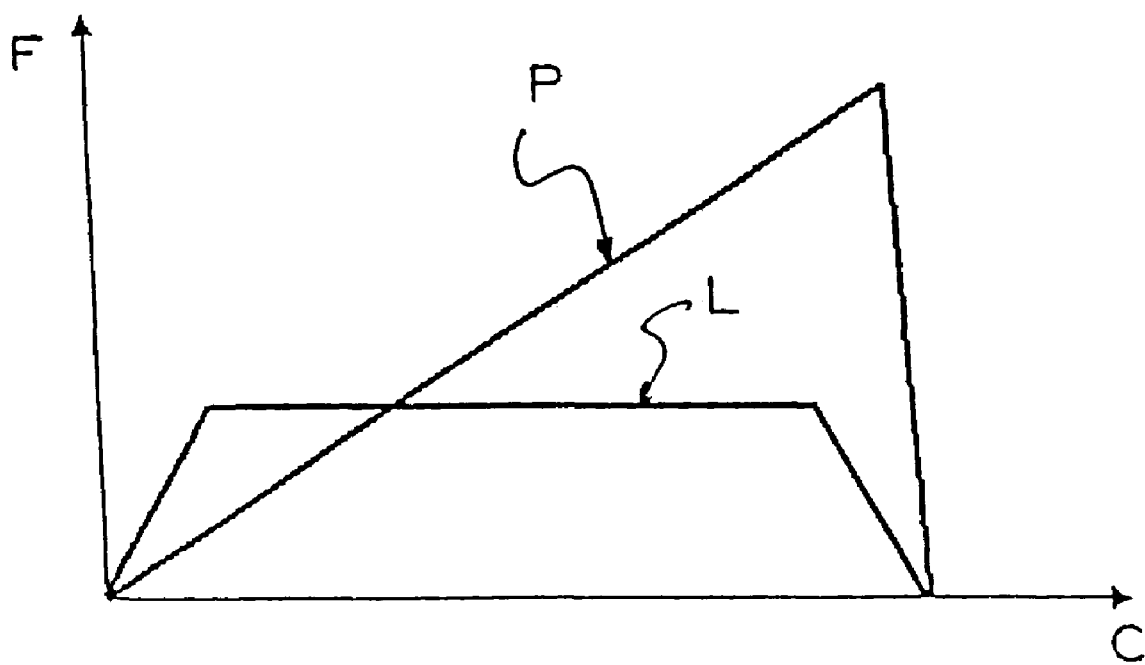

According to the invention, the shock absorber identified with general reference (1) is a hydraulic type shock absorber, comprising a shock absorber body (16), a principal compression chamber (2), on the interior of which slides according to a longitudinal axis of revolution (XX') a piston (3) carried by its rod (4).

The sliding of the piston (3) in chamber (2) takes place against a hydraulic damping device which partially transforms the kinetic energy of the piston (3) into thermal energy of a fluid (5) by means of bleeding with the aid of a bleed means (ML). The shock absorber (1) comprises, in addition, a volume compensation device (6) such as a sponge, permitting compensation of fluid volume (5) captured by the piston rod (4) in the compression chamber during the sliding process. Said shock absorber (1) is likewise equipped with an elastic compensation device, such as a spring (7).

According to the invention, the shock absorber (1) has at least two different operating modes which permit modification of the damping behavior, that is to say, its damping curve. These different operating modes correspond to the different bleed rate means (ML) which can be selected by the adjustment means (MR). Thus, according to the invention, the adjustment means permit selection of the employed bleeding means and thus the choice of shock absorber functioning, such as for example, linear functioning as illustrated by curve (L) of FIG. 1 or progressive functioning, illustrated by damping curve (P) of FIG. 1. In said Figure, on the abscissa, is represented the course of the piston (C) and on the ordinate, the force (F) to be applied to the piston rod in order to attain its course.

According to a first operating method—called linear variation—the force (F) which is to be applied is constant during the entire piston travel, regardless of piston position, as is illustrated in FIG. 1.

According to the invention, the shock absorber (1) comprises at least two different types of bleed means (ML), which are open to be utilized by the shock absorber according to the position of the shock absorber adjustment means (MR). It goes without saying that the shock absorber could also present supplementary bleed means so as to increase the possible number of different operating methods relative to the preferred described embodiment illustrated in FIGS. 2 to 9, which only includes two different operating modes or methods.

Figure 2:
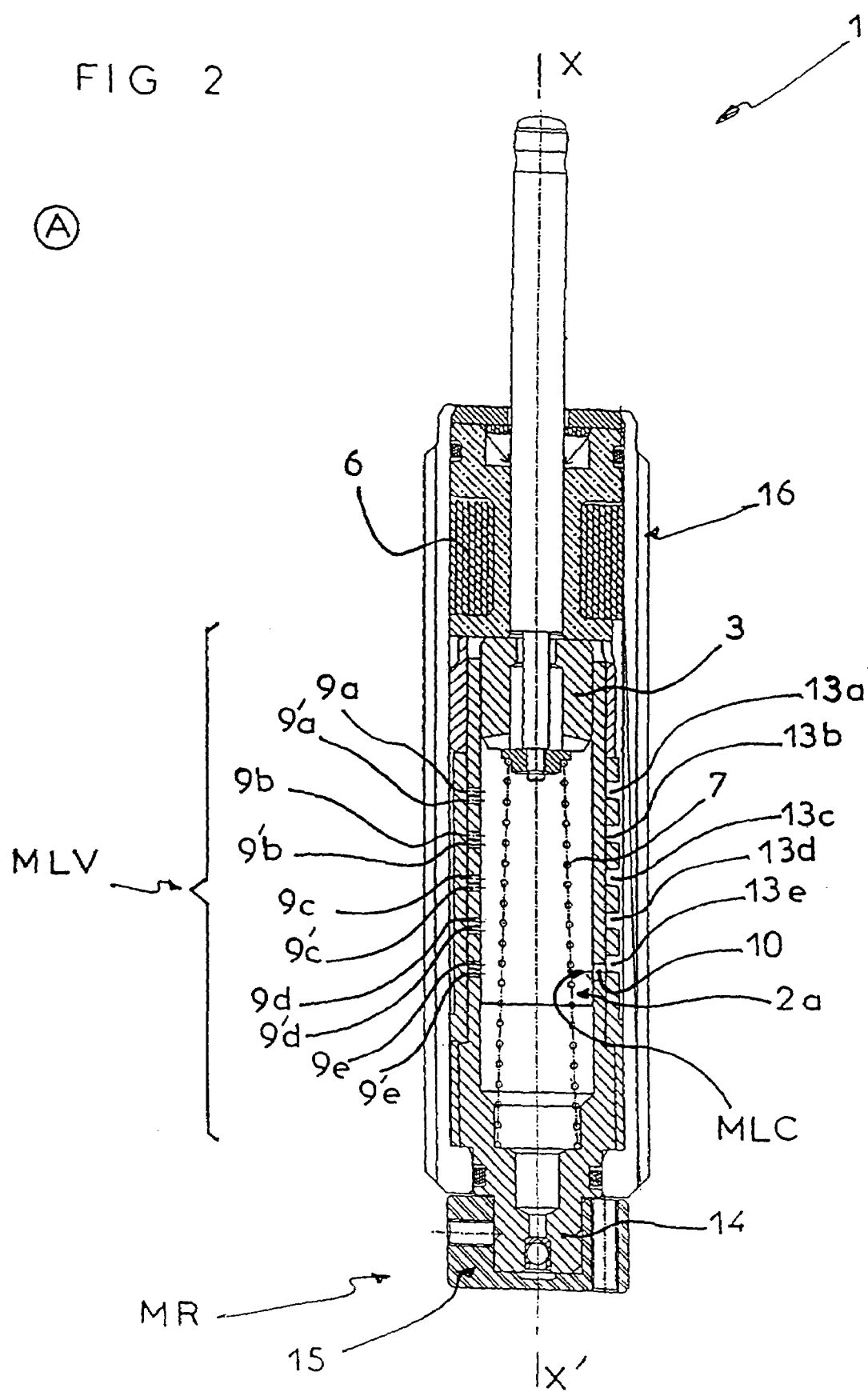

According to the illustrated embodiment of shock absorber (1) which comprises constant bleed rate means (MLC) permitting attainment of linear operating mode, with the surface of the orifice or orifices forming said bleed means remaining unchanged when the piston (3) moves in the compression chamber (2). As a result, these means (MLC) permit the bleeding of fluid (5) at a constant rate; they are beneficially formed by a bleed orifice (10) situated in the lower part of the compression chamber, slightly to the right where the piston (3) is located when the shock absorber is in the position of extreme compression. Said orifice (10) effects the bleed of the fluid (5) between the principal compression chamber (2) and the volume compensation chamber (20) of the compensation device of the shock absorber (1) when the adjustment means (MR) select the linear shock absorbing operating mode as illustrated in FIG. 2.

According to the specific embodiment described for shock absorber (1) it comprises variable bleed rate means (MLV) which permit attainment of a progressive operating mode thanks to variation of the drawing surface, i.e. of the rate according to the position of the piston (3) in the compression chamber (2). These variable bleed rate means (MLV) are beneficially formed by a set of drawing orifices ($9a$-$9'a$-$9''a$, $9b$-$9'b$-$9''b$, $9c$-$9'c$-$9''c$, $9d$-$9'd$-$9''d$, $9e$-$9'e$-$9''e$) which visibly extend along one of the generative systems of the compression chamber (2). These orifices ($9a$-$9'a$-$9''a$, $9b$-$9'b$-$9''b$, $9c$-$9'c$-$9''c$, $9d$-$9'd$-$9''d$, $9e$-$9'e$-''$e$) are distributed longitudinally along the course of the piston (3) and connect the compression chamber (2) and the volume compensation chamber (20) in order to draw fluid (5) at time of piston (3) and piston rod (4) displacement. Their placement along one of the generative systems allows, at time of piston displacement, variation of global bleed surface inasmuch as the number of orifices ($9a$-$9'a$-$9''a$, $9b$-$9'b$-$9''b$, $9c$-$9'c$-$9''c$, $9d$-$9'd$-$9''d$, $9e$-$9'e$-$9''e$) connecting the lower portion ($2a$) of the compression chamber (2)—where compression of the fluid (5) takes place,—with the compensation chamber (20), diminishes as the course (C) of the piston travel increases.

Thus, according to a preferred specific embodiment of shock absorber (1) the peripheral wall (8) of the compression chamber has cylindrical shape and includes in one of its generative systems a set of small holes, and more specifically, a succession of several pairs of small holes traversing the wall ($9a$-$9'a$-$9''a$, $9b$-$9'b$-$9''b$, $9c$-$9'c$-$9''c$, $9d$-$9'd$-$9''d$, $9e$-$9'e$-$9''e$) as shown in FIG. 9, extending over the length of the damping course of the piston, whereas the diametrically opposite generative system comprises a hole (10) traversing the wall as indicated FIG. 5. However, according to another preferred specific embodiment, the compression chamber includes a succession of several sets of three small holes ($9a$-$9a'$-$9''a$, $9b$-$9'b$-$9''b$, $9c$-$9'c$-$9''c$, $9d$-$9'd$-$9''d$, $9e$-$9'e$-$9''e$) which are positioned in a triangle as indicated in FIG. 10, said variation with sets of three holes permits fine-tuning the precision of the adjustment while conserving likewise continuity within said adjustment.

It is, of course, understood, that the number, the shape and the configuration of the holes which form small sets of successive holes of the variable bleed rate means could be different without going outside the protective field of the invention,—the same is true of the invention as essentially illustrated in the description of the first specific embodiment corresponding to pairs of successive holes.

Figure 3:
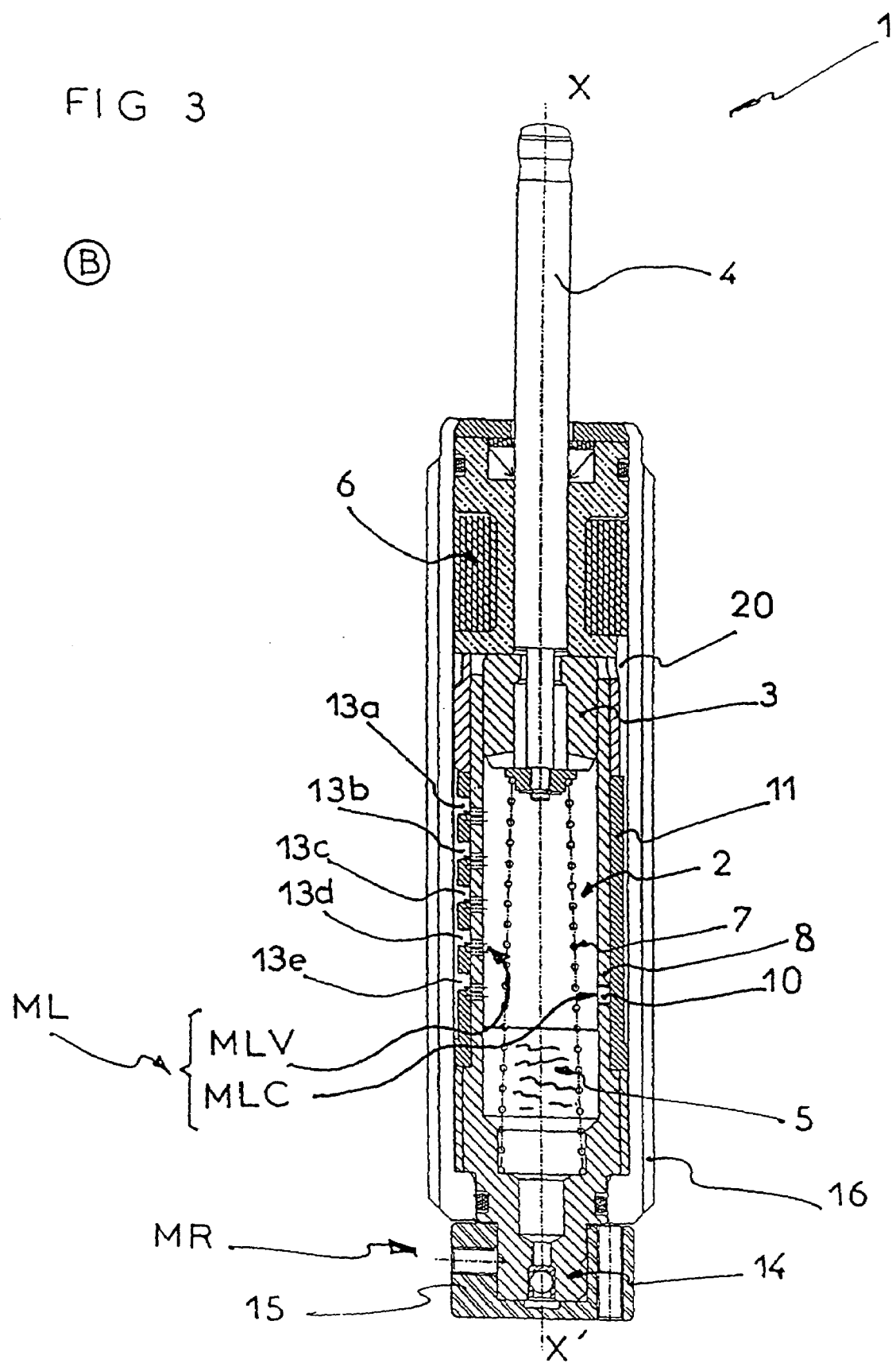

According to the first specific embodiment, the adjustment means (MR) of the shock absorber (1) beneficially comprise a mobile adjustment element (11) between at least two positions: a position (A), illustrated in FIG. 2, where the orifices ($9a$-$9a'$-$9''a$, $9b$-$9'b$-$9''b$, $9c$-$9'c$-$9''c$, $9d$-$9'd$-$9''d$, $9e$-$9'e$-$9''e$) of the variable bleed rate means (MLV) are obstructed, while the constant bleed rate means (MLC) are at least partially open and connect the compression chamber (2) with the compensation chamber (20), and a position (B) illustrated in FIG. 3, where the orifices (9a-9'a-9"a, 9b-9'b-9"b, 9c-9'c-9"c, 9d-9'd-9"d, 9e-9'e-9"e) of the variable bleed rate means (MLV) are at least partially free and connect the two aforementioned chambers (2, 20) in order to achieve a progressive operating mode.

Figure 4:
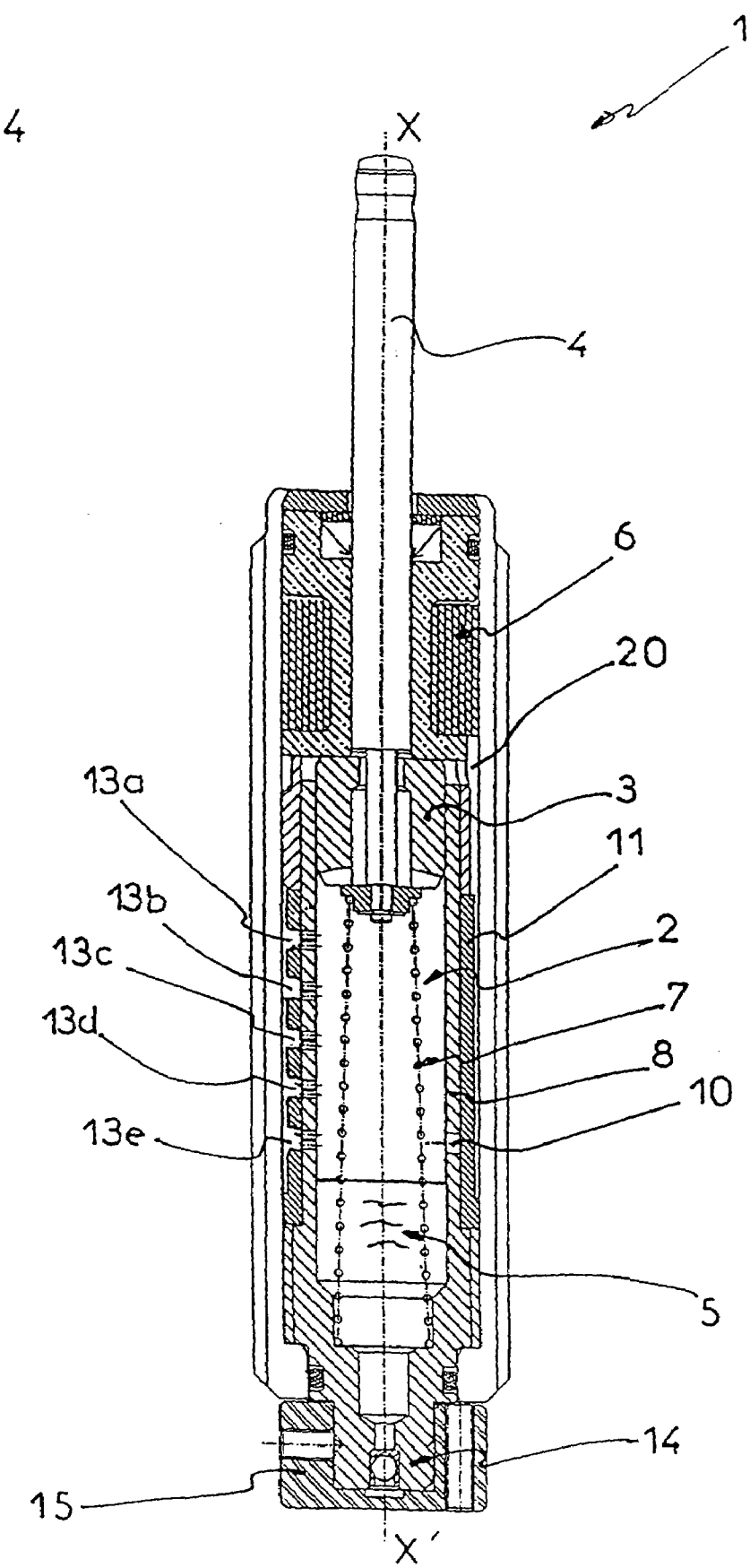

According to the preferred specific embodiment of the shock absorber (1) illustrated in FIGS. 2 to 4, the adjustment element (11) is formed by an external socket (11), respectively mobile in relation to the compression chamber (2) and whose peripheral wall (12) comprises a succession of parallel vents (13a, 13b, 13c, 13d, 13e); each of said vents extending according to an inclined diametric plane and partially at an angle (A) equal to approximately 155 degrees as indicated in FIGS. 6 and 7. It is, of course, understood, that the vents could extend at a 180° angle, for example, or any other value, without going outside the protected field of the invention. The fact that the parallel vents are inclined, as indicated in FIG. 8, permits variation of progressivity of damping by defining several indexed positions (A, B, C) of the socket;—a position (A) illustrated in FIG. 2, where the orifices (9a-9'a-9"a, 9b-9'b-9"b, 9c-9'c-9"c, 9d, 9'd, 9"d, 9e-9'e-9"e) are obstructed or where the only orifice (10) is open or partially open,—a position (B), illustrated in FIG. 3, where the orifice (10) is obstructed, while the vents (13a, 13b, 13c, 13d, 13e) leave open one of the orifices (9a-9'a, 9b-9'b, 9c-9'c-, 9d-9'd, 9e-9'e) of the associations of two orifices of the variable bleed rate means (MLV). One can likewise note a third position (C) where the set of orifices (9a-9'a, 9b-9'b, 9c-9'c, 9d-9'd, 9e-9'e) of the variable bleed rate means (MLV) is open, as indicated in FIG. 4. The various diverse positions of the shock absorber adjustment are obtained thanks to the particular construction of the socket (11) with the width (e) of the vents (13a, 13b, 13c, 13d, 13e) being greater than the width (L1) of a pair of orifices and which is thus sufficient for permitting the release of pairs of orifices.

It is, of course, understood that one could likewise index a second adjustment position complementary to the illustrated position (A) where orifice (10) would be totally open, thus diminishing the rigidity of the shock absorber as well as other positions where the associations of orifices (9a-9'a, 9b-9'b, 9c-9'c, 9d-9'd, 9e-9'e) of the variable bleed rate means are left more or less free.

The adjustment element (11) is respectively mobile in adjustable fashion in relation to the compression chamber (2) or inversely, and more specifically in relation to the constant and variable bleed rate means (MLV, MLC) of the shock absorber (1). To that end, the socket (11) is mounted in mobile fashion in rotation around the longitudinal axis (XX') of the shock absorber in relation to the compression chamber (2). Thus, according to the preferred specific embodiment of the shock absorber (1), the extremity of the compression chamber opposite the one arranged on the side of the piston rod comprises an extension (14) going outside the exterior of the body of the shock absorber, and on which is fixed an adjustment button (15).

It should be noted that the preferred embodiment of the shock absorber is the set constituted by the compression chamber (2) with its projection (14) and the adjustment button (15), which is mobile in rotation around the longitudinal axis (XX') in relation to the external socket (11). Thus, by manipulating the adjustment button, and more precisely, by rotating same, which causes the chamber to rotate in relation to the socket, which is fixed in relation to the body (16), it is possible for the user to pass from position (A) illustrated in FIG. 2, to position (B) or (C) illustrated in FIG. 3 or FIG. 4 or any other intermediate position which is not shown, and vice-versa. It goes without saying that the adjustment device could utilize a fixed compression chamber and an external mobile socket, the rotation of which would be controlled by the adjustment nut, without going outside the protected field of the invention. It should also be noted that in order to facilitate and simplify the representation of the shock absorber in FIGS. 2, 3, and 4, the compression chamber and its adjustment extension are illustrated as though they were fixed, while the adjustment socket is illustrated as being mobile in relation to the chamber of compression.

According to the preferred specific embodiment of the shock absorber according to the invention, the adjustment between the socket (11) and the chamber (2) is beneficially of the continuous type, thanks to the particular construction of the socket and to the dimension of its vents (13a, 13b, 13c, 13d, 13e) and the bleed means of the chamber (10, 9a-9'a, 9b-9'b, 9c-9'c, 9d-9'd, 9e-9'e), with the relative placement between the chamber and the socket taking place in continuous manner on the group of the arc (A) portion, on which the vents extend (13a, 13b, 13c, 13d, 13e). It should be noted that the adjustment button (15) may include a detensification device and/or a graduation device in order to permit fine-tuned adjustment of damping and of its rigidity.

It may, however, also be different and the adjustment system of the socket (11) and the compression chamber (2) could be of the intermittent type and include a group of respective socket positions (11) and chamber (2) positions which are indexed while preserving the specific arrangement of the illustrated shock absorber embodiment.

According to a variation of the preferred embodiment illustrated in FIG. 10, the peripheral wall of the compression chamber no longer presents pairs of successive orifices but groups of three orifices (9a-9'a-9"a, 9b-9'b-9"b, 9c-9'c-9"c, 9d-9'd-9"d, 9e-9'e-9"e), which are arranged in a triangle. Said solution permits having for each group a drawing surface continuity according to the longitudinal axis (ZZ') of the shock absorber (1) since the longitudinal space between the two orifices (9a, 9'a) which would exist in the first embodiment, is now occupied by the third orifice (9"a) which is slightly displaced in relation to the generative system, on which the two other orifices (9a, 9'a) are located. As a result, it is thus possible to regulate the rigidity of the shock absorber in perfectly continuous manner without being hampered by intervals which exist between the orifices of the preceding embodiment.

In addition, it is important to note that in the preceding descriptions of specific embodiments, the width of transverse inclined vents (e) is not necessarily greater than the width (L1) of a group of orifices (9a-9'a-9"a, 9b-9'b-9"b, 9c-9'c-9"c, 9d-9'd-9"d, 9e-9'e-9"e), but it can likewise be smaller than or equal to without going outside the protected field of the invention.

Figure 11:
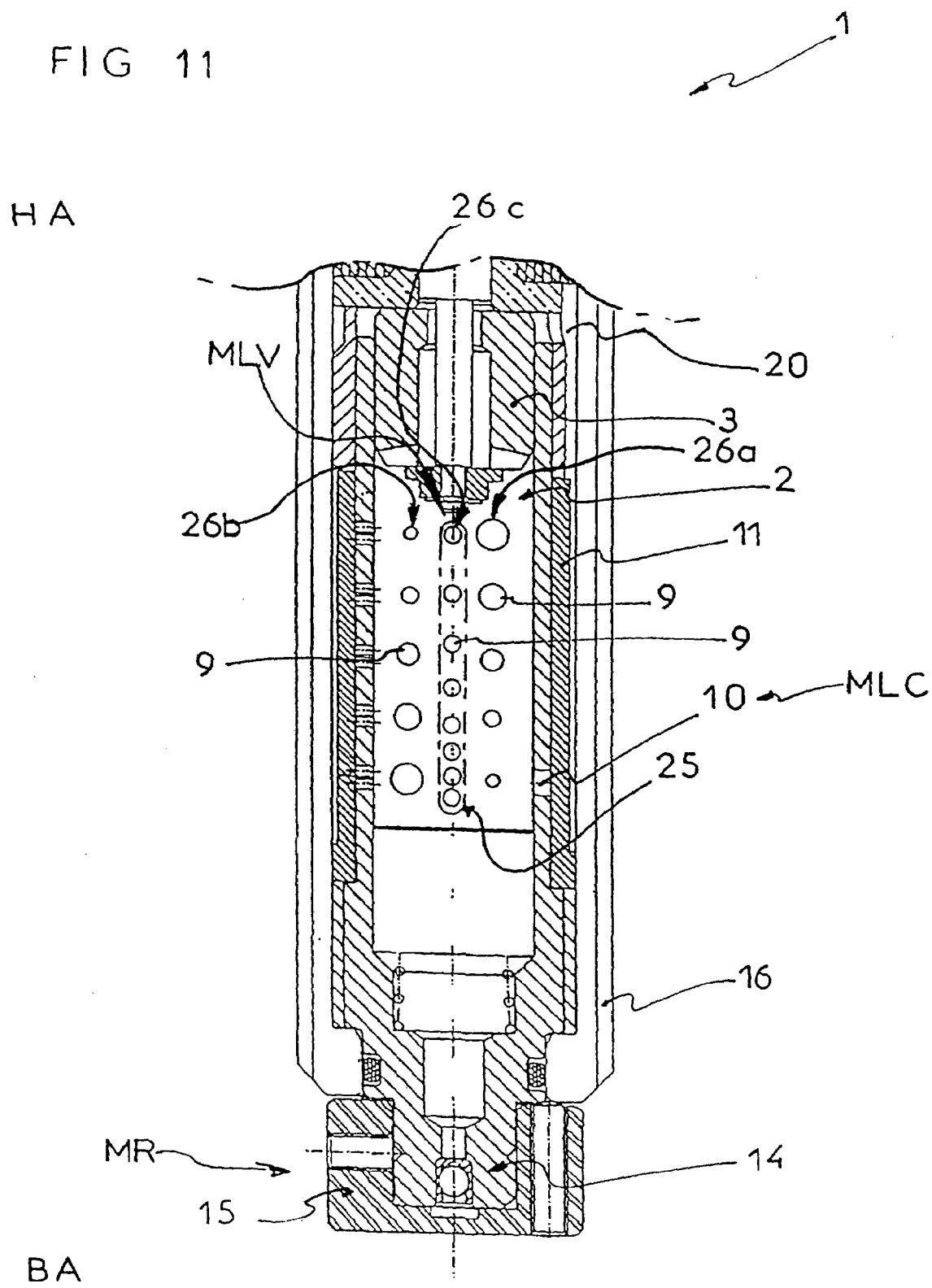

In addition, according to a variation of the shock absorber embodiment illustrated in FIG. 11, the external socket (11) does not include inclined transverse vents, but a longitudinal opening (25), destined to approach according to the indexed positions, as compared with the bleed rate means (MLC, MLV) of the previously described type, which are carried along several generative systems of the principal compression chamber (2), for example.

According to this variation of embodiment illustrated in FIG. 11, the variable bleed rate means (MLV) are formed by three series (26a, 26b, 26c) of orifices (9) each arranged on a generative system of the compression chamber (2) while the constant drawing means (MLC) are formed by an orifice (10), which is identical to the one described previously. It should be noted that the orifices (9) in the same series (26a, 26b) can have different dimensions and suggest a diameter increasing from top (HA) towards the bottom (BA) or vice-versa. One should also take note that the number of orifices can vary as well as the spacing of the orifices (9) in one and the same series (26c).

It goes without saying that these multiple variations, which permit adaptation of the type and The rigidity of the damping in order to attain the desired damping curve, can be utilized with a shock absorber of the previously described type, having an adjustment socket with transverse vent, for example.

In addition, it should be noted that in the illustrated embodiments, the compensation chamber (20) is arranged in annular fashion between the body (16) and the chamber (2), equipped with socket (11) and that the sponge (6) is located in the up-stream portion of the shock absorber (1) at the guides level of the piston rod.

Of course, the invention is not limited to the embodiment described and represented by way of example, but it also includes all equivalents as well as any combination thereof.

Having thus described the preferred embodiment, the invention is now claimed to be:

1. A hydraulic shock absorber comprising:
   a shock absorber body in the interior of which a compression chamber is defined, the compression chamber including a peripheral cylindrical wall;
   a piston and a piston rod slidably mounted in the compression chamber to compress a damping fluid; and
   a bleed rate selection means for selecting between a constant bleed rate mode and a variable bleed rate mode, with different damping characteristics, the bleed rate selection means including:
      a constant bleed rate orifice situated in the lower portion of a wall of the compression chamber for connecting the compression chamber with a volume compensation chamber,
      a set of variable bleed rate orifices defined in the wall of the compensation chamber for connecting the compression chamber with the compensation chamber of the shock absorber and distributed along a path of travel of the piston, and
      an adjustment socket, for selectively opening and closing the constant bleed rate orifice and the set of variable bleed rate orifices, rotatably mounted for rotation around the compression chamber between (1) a linear mode position where the variable bleed rate orifices are obstructed by a peripheral wall of the socket and the constant bleed rate orifice is open and (2) at least one progressive mode position where the variable bleed rate orifices are at least partially free.

2. The shock absorber according to claim 1 wherein the adjustment socket comprises:
   a peripheral wall which includes a succession of parallel vents, said vents extending in part at an arc in a slightly inclined plane in relation to a diametric transverse plane.

3. The shock absorber according to claim 1 wherein a relative position of the adjustment socket and of the compression chamber is regulated by a control button.

4. The shock absorber according to claim 3 wherein the variable bleed rate means includes a succession of orifices set in pairs or groups of three.

5. The shock absorber according to claim 1 wherein at least one of the dimensions of the variable bleed rate orifices and the spacing of the variable bleed rate orifices varies along the path of travel of the piston.

6. An adjustable shock absorber which is operable in constant damping force and progressive damping force modes, the shock absorber comprising:
   a chamber in which are defined (i) a constant bleed rate orifice adjacent a far end thereof, and (ii) a series of variable bleed rate orifices spaced between a near end and the far end thereof;
   a piston mounted in the chamber for travel between the near end and the far end; and,
   a means for selectively (a) opening the variable bleed rate orifices to select a progressive mode and (b) completely closing the variable bleed rate orifices and opening the constant bleed rate orifices to select a linear mode.

7. The shock absorber as set forth in claim 6 wherein the means for opening and closing the constant bleed rate orifices and the variable bleed rate orifices opens and closes at least the variable bleed rate orifices to a selectable degree for adjusting damping force characteristics of the progressive mode.

8. The shock absorber as set forth in claim 6 wherein the means for opening and closing the variable and constant bleed rate orifices includes:
   a cylinder having apertures which align to selectable degrees with the variable and constant bleed rate orifices.

* * * * *